2 Sheets--Sheet 1.

J. H. THORP.

Coal-Oil Stove.

No. 5,418. Reissued May 20, 1873.

Witnesses.

Inventor.

James H. Thorp

Jr. Saml Gardiner Atty.

A.M. PHOTO-LITHOGRAPHIC CO. N.Y. (OSBORNE'S PROCESS.)

2 Sheets--Sheet 2.

J. H. THORP.

Coal-Oil Stove.

No. 5,418.

Reissued May 20, 1873.

Witnesses:
Thos. Dwell

Inventor:
James H. Thorp
per Saml. Gardiner. atty.

AM. PHOTO-LITHOGRAPHIC CO. N.Y. (OSBORNE'S PROCESS.)

UNITED STATES PATENT OFFICE.

JAMES H. THORP, OF NEW YORK, N. Y.

IMPROVEMENT IN COAL-OIL STOVES.

Specification forming part of Letters Patent No. 129,436, dated July 16, 1872; reissue No. 5,418, dated May 20, 1873; application filed April 3, 1873.

*To all whom it may concern:*

Be it known that I, JAMES H. THORP, of New York, N. Y., have invented certain new and useful Improvements in Coal-Oil Stoves; and I do hereby declare that the following is a full, clear, and exact description thereof, that will enable others skilled in the art to which it appertains to make and use the same, reference being had to the accompanying drawing and to the letters of reference marked thereon which form a part of this specification.

*Nature and Object of the Invention.*

The first part of my invention relates to an improvement in the manner of arranging a water-wick outside of the tube containing the oil-wick, so as to allow the toothed wheels bearing on the said oil-wick to operate freely without having the said water-wick interfere with the revolutions of the toothed wheels in raising and lowering the wick. It consists of a series of independent tubes arranged on the sides of the tubes containing the oil-wicks next to the rods to which the toothed wheels are attached. These tubes project from within a short distance of the top of the oil-wick tubes nearly to the bottom of the water-reservoir, sufficient space only being allowed between the lower end of the tubes and the bottom of the reservoir to permit the wick to project out and be constantly in contact with the water. Between these several tubes ample space is allowed for the toothed wheels to pass freely into the oil-wick tubes for the purpose of catching hold of the wick to raise or lower the same as more or less heat is required in the stove. It not unfrequently happens while the thumb-screws are being turned to raise or lower the oil-wick, on the old plan, that the toothed wheels become entangled in the water-wick, through which they pass, which obstructs the free adjustment of the raising and lowering device. This feature of my invention is intended to obviate this difficulty. The second part of my invention relates to the use of a metallic jacket surrounding the flues or chimneys through which the flames pass, and to prevent the escape of the heat, and concentrate or utilize the same for cooking or heating purposes. This device consists of a band, cylindrical or of any other convenient shape, to rest upon the base of the lamp, and extend above the chimneys to form a rest for the stove-fixtures, if desirable for light work. When it is desirable to use the cooking utensils directly on the cylinder or casing E, I use a cylinder with perforations near the top and bottom—the former to allow a draft for the lamp; the latter to afford an entrance for the air from without to facilitate that draft. This cylinder or casing may have its sides cut away, and mica may be inserted in the openings opposite to the large mica plates in the chimneys to allow the light to pass out and illuminate the room at night while the cooking is going on without the necessity of other light. I desire to use mica in the ends of the chimneys, and in the sides also, if necessary. The third part of my invention relates to one or more openings in the top plate of the oil-reservoir to give vent to the gases generated by heat from the lamp, and at the same time to serve as openings, into which a hook may be introduced to catch the oil-wicks in case they should by accident fall beyond the reach of the toothed wheels intended to raise and lower the same. These openings are formed in the upper plate of the oil-reservoir, and are surrounded by boxes, which have hinged covers that may remain closed under ordinary circumstances; but should it be necessary to give vent to the oil-reservoir by opening them, the explosive vapor may pass off beyond the influence of the flame or heat from the lamp. The fourth part of my invention relates to the furnishing of an auxiliary lamp that may be moved around the stove to supply light to the same, so that the attendant may be enabled to attend to her work about the stove at night without the aid of another lamp. This device consists of an ordinary lamp with a metallic reservoir having one of its sides made to conform to the contour of stove's base, to which it is loosely suspended. On this side of the lamp is firmly fixed a hook extending vertically above its reservoir, which may be hung upon the flange forming the side of the water-vessel. This lamp may be moved at pleasure about the axis of the stove by simply sliding it around the same on the flange, to which it is hooked. The auxiliary lamp is not unlike any other lamp used for illuminating purposes, with the exception that one of its sides (the side of the oil-receptacle) is curved inward to conform to the curvature of the vessel about which it is intended to move. It is supported by the hooks *k* as it is moved around the stove.

*General Description.*

Figure 1:
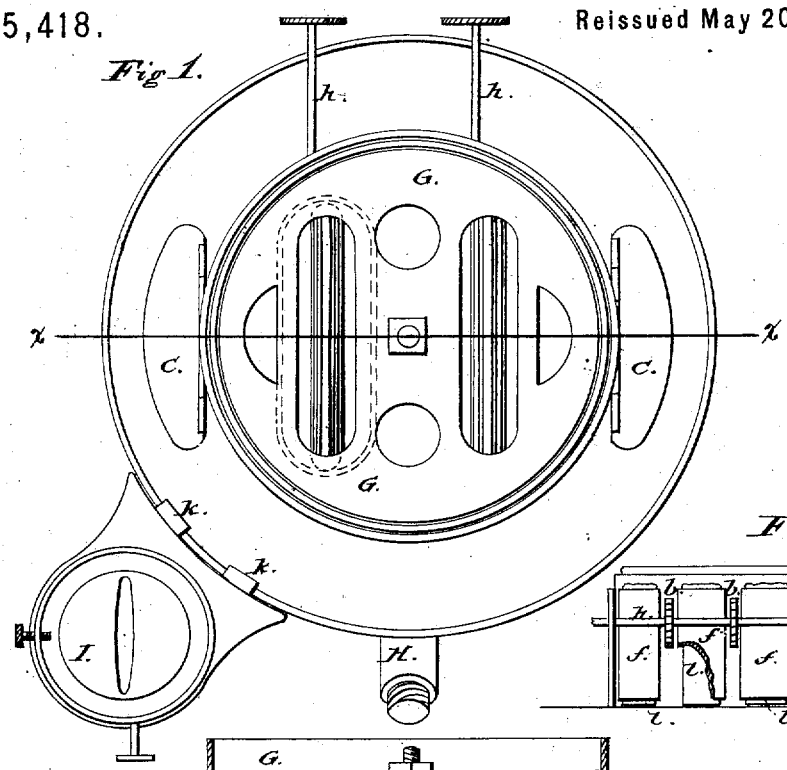
Figure 1 is a plan view, showing the upper arrangements and general form of heater.
Figure 3:
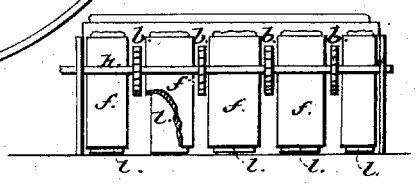
Fig. 3, a detail of water-wicks, cog-wheels, &c.
Figure 2:
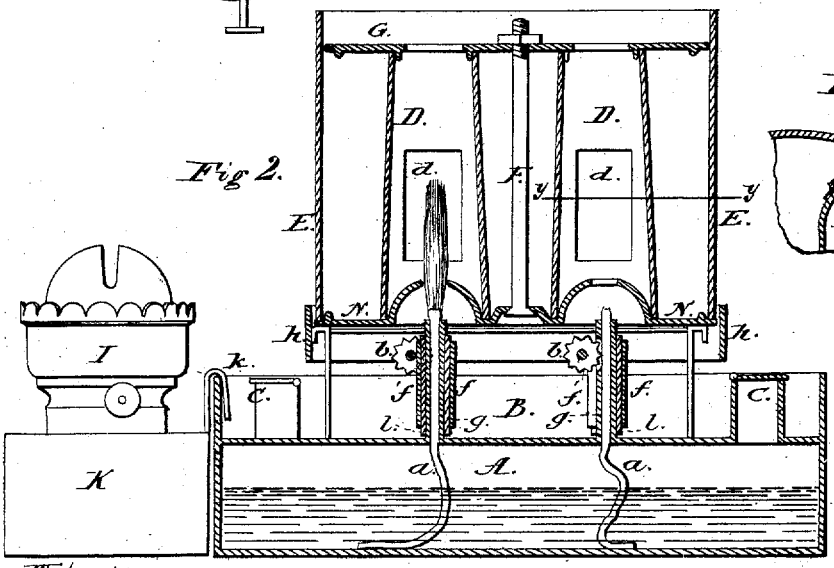
Fig. 2, transverse section on line X X of Fig. 1.
Figure 4:
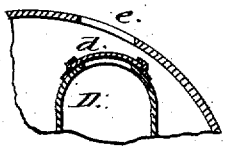
Fig. 4, section on line Y Y of Fig 2.
Figure 5:
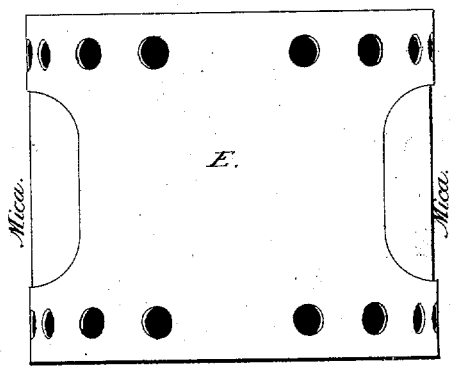
Fig. 5, elevation of perforated cylinder.
Figure 6:
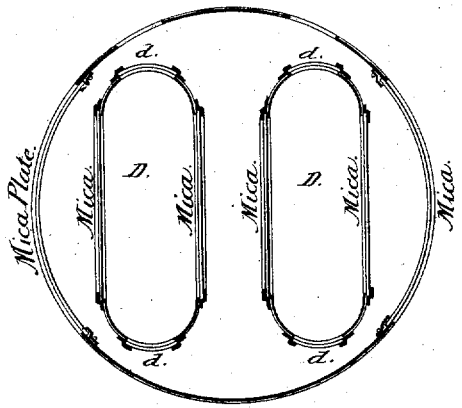
Fig. 6, plan of same.

A is the oil-reservoir, which is covered by the plate which forms, also, the bottom of the water-vessel B above the same. C C are the box openings, provided with hinged covers, which may be opened when it is necessary to recover the wick, which may by accident have slipped from the teeth of the raising and lowering device; or to allow the gas generated by overheating of the oil while the stove is in use, to escape. The rims of the boxes covering these openings extend above the surface of the water in the water-vessel. *a a* are the oil-wicks, surrounded by the tubes *l l*. These wicks are very wide, and are composed of any porous material, fibrous or textile, which would absorb water. These tubes have slots cut in them on one side to allow the toothed-wheels *b b b* to pass through and engage the oil-wick, which is to be lowered or raised to increase or diminish the flame. There are several of the toothed wheels arranged on rods, which have attached to their ends thumb-screws, to be handled in lowering or raising the oil-wicks. The rods to which these wheels are attached have upright supports secured to the bottom of the water-vessel. On the side of the oil-wick tubes *l*, next to the raising and lowering device, is the series of tubes *f* surrounding the water-wicks and extending from near the top of the oil-wick tube to within a short distance of the bottom of the reservoir for water. These tubes are open at the top and bottom, and the wicks in them come in contact with the water only at the bottom of the reservoir, and thus absorb the water from the bottom and not from the surface. In old methods of arranging water-wicks they pass from the tubes and enter the water at the surface. If by any accident oil should get into the water-reservoir by being spilled therein, or by running over the oil-wick tubes, or by any other means, it would float on the surface of the water and be absorbed with it into the water-wicks, thus rendering them liable to take fire and heat the oil-wick tubes, the very occurrence they are designed to prevent. This defect my device is intended to overcome. I arrange my tubes so that the wicks will enter the water at the bottom of the reservoir, and thus the water, (which it is intended shall be kept as nearly as possible about half way up the length of the tube,) is always absorbed into the water-wicks at the bottom and never from the surface, so that whatever oil may by any possibility get into the water-reservoir and float on the surface of the water, can never come in contact with the wicks; and, further, by this arrangement, as long as any water remains in the reservoir, the wick is kept immersed in it. On the side of the oil-wick tube, opposite to the one in which the toothed wheels are used to raise and lower the wick, I make use of a single water-wick tube of the same width as the oil-wick tube, but arranged like the separate tubes *f f*, with reference to the manner in which the wick shall act upon the water. The arrangement of the separate tubes is, as before stated, to allow free play to the toothed wheels *b b b*, as they perform the work of lowering and raising the oil-wicks. The metal disk N, with its spaces surrounding the points where combustion takes place, is of the usual form, and is supported by legs, which rest on the bottom of the water-vessel. Chimneys D D, having their horizontal sections of the oval form, and of a reduced size at their tops, are held in their places by a rod, forming a screw-bolt, passing between them vertically, the same being secured to the lower plate N and upper plate G. These chimneys D D have openings, *d d*, which may be closed up when necessary by mica-plates, which slide vertically, as shown in Fig. 4 of drawing. E is a casing of a cylindrical or other form, surrounding the chimneys D D, composed of metal or other material, with its inner surface polished. This cylinder is to confine and concentrate the heat when the stove is being used for baking or other purposes, when it is important to utilize the greatest amount of the same. This casing is supported on the plate N, and is kept in its place by small flanges projecting from the upper surface of said plate. Openings *e* are left in this cylinder, as shown in Fig. 4, so that the blaze may be watched and regulated. This casing may be dispensed with, if desirable, or adjusted at a moment's notice, as it is not a fixed feature of the stove. H is a tube extending obliquely from the side of the oil-reservoir A, through which the oil is poured to supply the same. The tube has a close-fitting cap to exclude the dust, &c. I is the small lamp; K being the oil-reservoir, and *k k* being the hooks by which it is kept in its place as it is moved about the axis of the heater to give light around the same.

*Claims.*

1. The tubes *f f f* so arranged that the water-wicks shall absorb the water only from the bottom of the water-reservoir, in combination with the toothed wheels *b b*, and having between them spaces to allow a free movement of said wheels, as and for the purpose set forth.

2. The auxiliary lamp I, with one of the sides of its oil-reservoir curved inward, provided with metallic hooks *k* to support it on the rim of the water-vessel of the stove, as and for the purpose set forth.

3. The mica side lights in the lamp-chimneys, with corresponding lights in the outer cylinder or jacket, as and for the purpose set forth.

In testimony that I claim the foregoing I have hereunto set my hand.

JAMES H. THORP.

Witnesses:
WILTON C. DONN,
HENRY KAISER.